United States Patent [19]
Whatley, Sr.

[11] Patent Number: 5,363,868
[45] Date of Patent: Nov. 15, 1994

[54] RAPID VEHICLE WASHER SYSTEM

[76] Inventor: William J. Whatley, Sr., 899 Pearl St. #4, Denver, Colo. 80203-3321

[21] Appl. No.: 6,750

[22] Filed: Jan. 21, 1993

[51] Int. Cl.$^5$ .............................................. B60S 3/04
[52] U.S. Cl. .................................. 134/102.2; 134/123
[58] Field of Search .................... 134/45, 57 R, 102.2, 134/123, 180, 181

[56]  References Cited
U.S. PATENT DOCUMENTS

| | | | |
|---|---|---|---|
| 1,183,391 | 5/1916 | Mason | 134/123 |
| 3,038,481 | 6/1962 | Brechtel | 134/123 X |
| 3,190,297 | 6/1965 | Austin et al. | 134/123 |
| 3,258,019 | 6/1966 | Bellas et al. | 134/123 X |
| 3,259,138 | 7/1966 | Heinicke | 134/181 X |
| 3,339,565 | 9/1967 | Williams | 134/180 X |
| 3,660,159 | 5/1972 | Larkin, Jr. | 134/123 X |
| 4,715,391 | 12/1987 | Scheller | 134/123 X |
| 4,739,779 | 4/1988 | Jones et al. | 134/123 X |
| 5,033,489 | 7/1991 | Ferre et al. | 134/123 X |

Primary Examiner—Philip R. Coe

[57] ABSTRACT

The process for cleaning the exterior surfaces of vehicles utilizes pressure vessels to store the cleaning liquid, usually water, under high pressure. The cleaning liquid is then released at a high flow rate for only a few seconds, thus reducing the time needed to wash a vehicle. The cleaning liquid is released through a multitude of nozzles arrayed and moved in such a manner that all exterior surfaces of a vehicle are impinged by the liquid. The arrayed nozzles are suspended from stationary frames, one on each side of the vehicle, in such a way that the array is moved horizontally, parallel to the long axis of a vehicle to assure complete coverage and scouring of the vehicle. Additionally, the end sections of the nozzle arrays may be pivoted so as to better impinge the front and rear surfaces of a vehicle. Tn the preferred embodiment, the stationary frames aforementioned are so fabricated as to form the primary pressure vessels used for liquid storage.

2 Claims, 7 Drawing Sheets

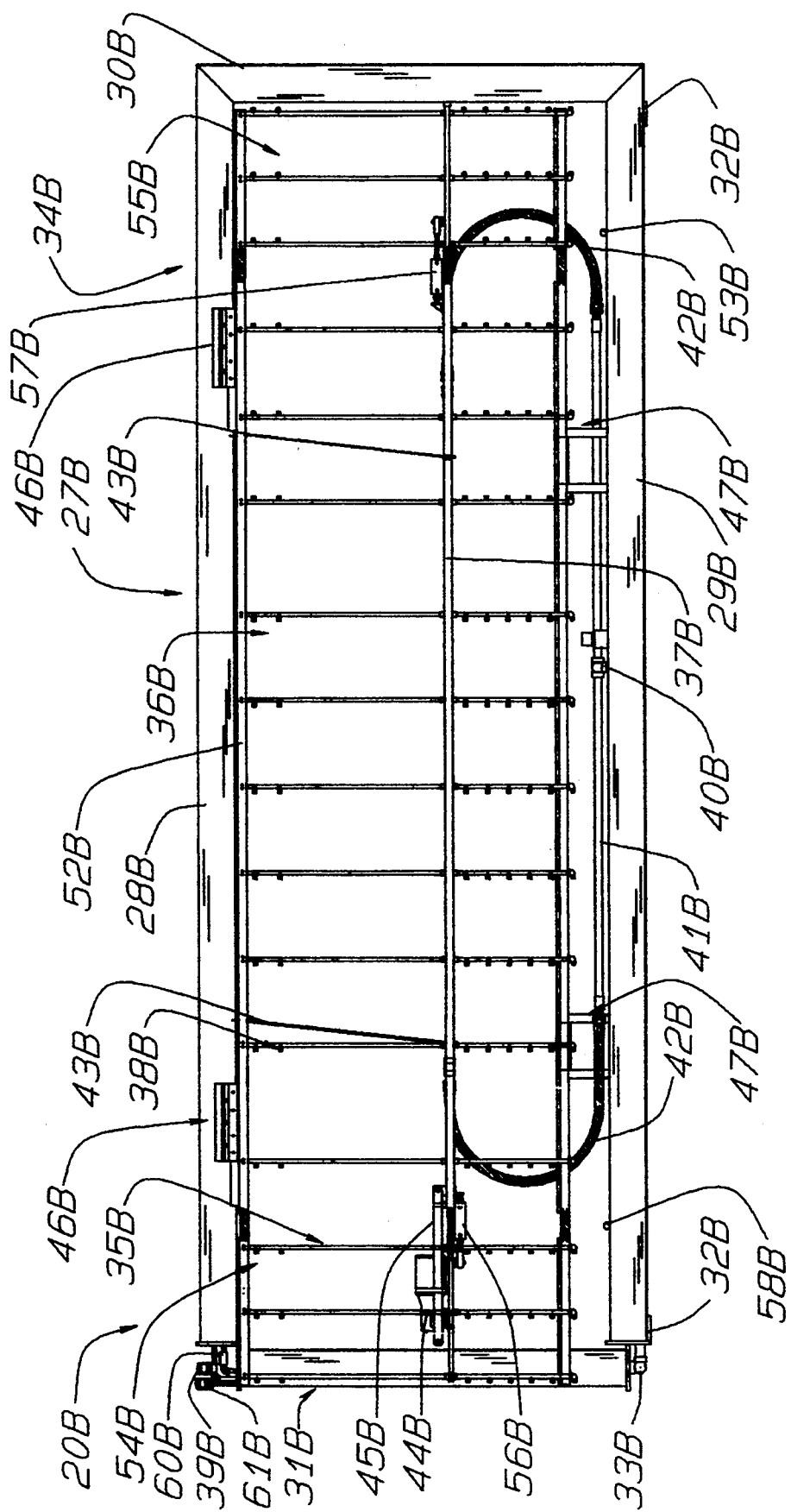

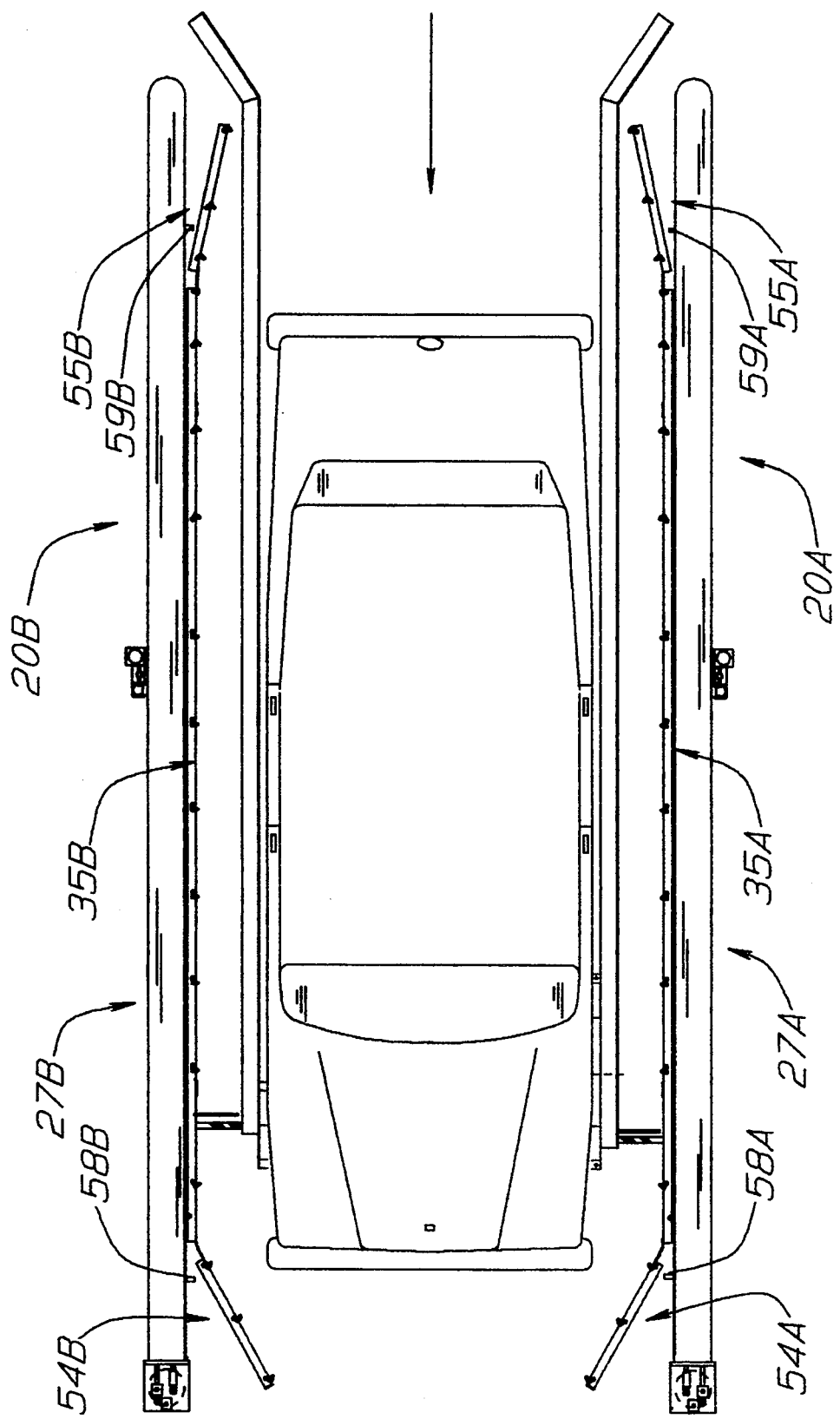

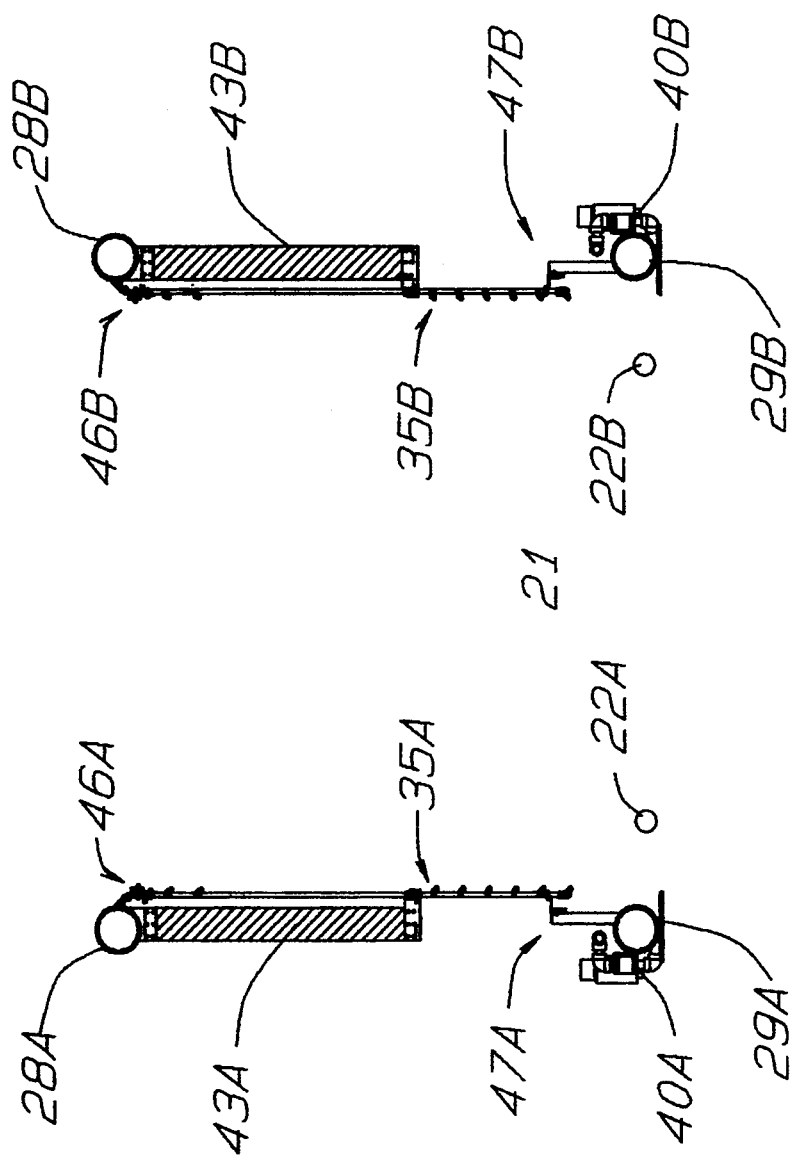

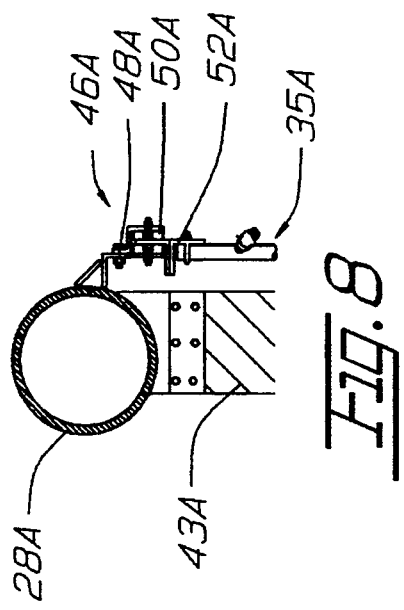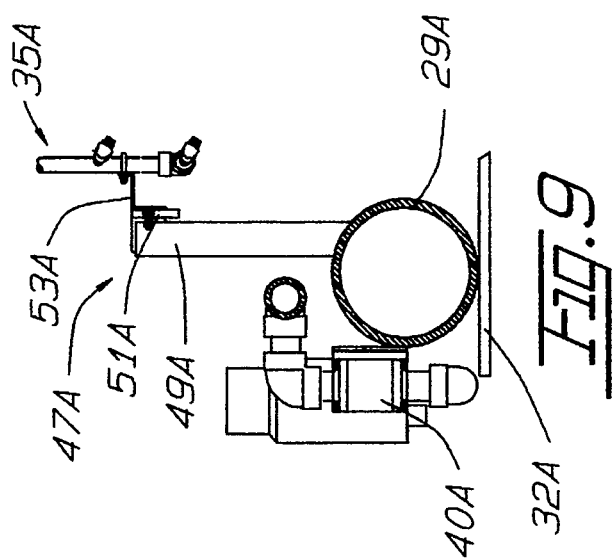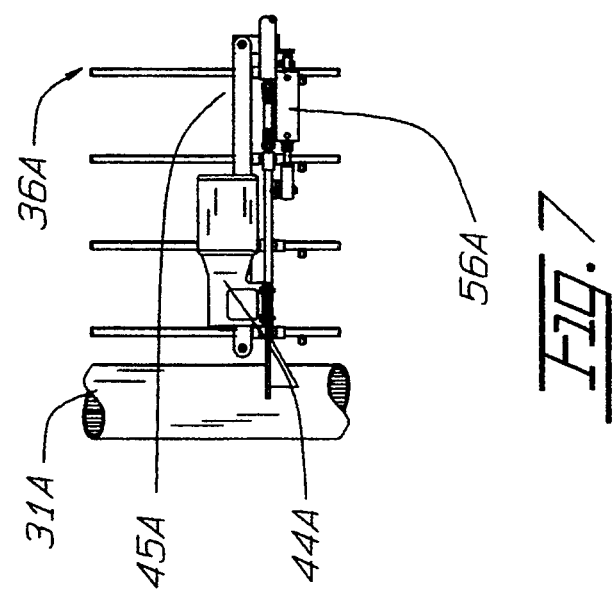

RAPID VEHICLE WASHER SYSTEM

BACKGROUND-FIELD OF INVENTION

The present invention relates generally to automatic vehicle washers and more particularly to "high pressure," brushless, vehicle wash systems for stationary vehicles.

BACKGROUND-DESCRIPTION OF PRIOR ART

Most washers for a stationary vehicle include a bay and a moving track mounted gantry that "rolls over" the vehicle or an overhead mounted arm that moves around the vehicle, either of which serve to support the nozzles discharging liquids onto the vehicle. Such a wash system may clean a vehicle by spraying liquid (usually water) at elevated pressure to impinge upon the vehicle rather than using brushes or other materials which rub against the vehicle. A vehicle, such as a car, truck, or bus is positioned within the bay, and the gantry or arm moves between the front and rear of the vehicle one or more times while a cleanser is sprayed on. Following this, a pump pressurizes water to impinge upon and wash the vehicle. Such designs are intended to minimize electric and water service requirements which are often a major cost of installation. To achieve this economy, pumps are sized small and the moving gantry or arm supporting the discharge nozzles serves to concentrate all of their output onto a small portion of the vehicle being washed. The pumps supplying cleansers run only while the agent is being applied and the larger high pressure pumps run only while supplying impingement water onto the vehicle, therefore, the various pumps only run intermittently during the wash procedure. The time required for the gantry or arm to traverse its route over or around the vehicle applying these cleansers and impingement water is economically undesirable in that it reduces the number of vehicles than be washed in any given period of time.

Most of the prior art washers have one or more sets of nozzles for low pressure cleansers plus one or more sets of nozzles for high pressure water discharge. Their design concerns itself with the positioning of these nozzles to obtain adequate coverage and impingement.

All of such prior art systems consist of an assembly of numerous mechanisms, swiveling pipe unions, electric motors, wheels, bearings, and drive components. Such an assembly takes an undesirably long period of time to wash a vehicle and it's multitude of mechanisms subject it to severe maintenance problems arising from the wet and dirty conditions in a washer bay. This results in excessive down time of the machine and loss of revenues for the operators thereof.

SUMMARY OF THE INVENTION

The essence of the present invention is a process to rapidly and economically wash vehicles such as automobiles, trucks, busses, trains, or various specialty military vehicles, an important aspect of which is the use of pressure vessels to store liquid, usually water, under pressure. At the core of the process is a new and novel apparatus in which sufficient liquid is stored in pressure vessels to scour the vehicle with liquid. This liquid is rapidly released from the pressure vessels at a high rate of flow through a multitude of nozzles arrayed on an apparatus so as to spray the front, top, sides, and rear of the vehicle simultaneously, thus impinging the entire vehicle surface within seconds. This process, therefore, allows a high through-put of vehicles while maintaining the economy of smaller electric and water service requirements.

In the preferred embodiment, the frame of the invention that supports the arrayed nozzles is so constructed as to form pressure vessels for high pressure liquid storage. A relatively small conventional high pressure pump discharges into these vessels over a period of time prior to its release at the high flow rate previously described. Similarly, the lower pressure cleanser liquids and any other materials as are to be used may be stored in pressure tanks, such as are used in small domestic water systems, prior to their release onto the vehicle being washed at a high flow rate.

Thus, an object of my rapid vehicle washer is an improved washing process that will wash a vehicle in substantially less time than the mechanisms of prior art teachings, thereby improving the economy of operation. Yet another object of the present invention is to improve the impingement of high pressure liquid upon the surfaces of the vehicle, thus providing a better wash. A further object of the present invention is a means of supporting the discharge nozzle arrays so only limited motion is required and the supporting frames remains stationary, thus minimizing the mechanical devices required to deliver liquids to the surfaces of the vehicle being washed.

A further object of my vehicle washer process is a more reliable vehicle wash system that has fewer mechanical components and moving parts and, thus, is less subject to breakdowns and is easier to maintain, thereby improving the economy of operation. Such an apparatus will also be less expensive to manufacture and install. Decreasing electrical energy consumption and air pollutants are further objects of this invention.

Still further details, advantages, and refinements of the present invention will become evident as this description proceeds.

BRIEF DESCRIPTION OF THE DRAWINGS

A preferred embodiment of the present invention is described herein with reference to the drawings wherein:

FIG. 4 is a side view of the far side of the preferred embodiment as shown in FIG. 1.

FIG. 5 is a view from above the apparatus illustrating it's configuration when a vehicle of suitable size is positioned to be washed.

FIG. 6 is a vertical cross-sectional view of the preferred embodiment taken along lines 6—6 in FIG. 2.

FIG. 7 illustrates the detail of the mechanism that moves the arrayed spray nozzles.

FIG. 8 is a detail of the nozzle array rack's upper guide rail and stabilizer assembly.

FIG. 9 is a detail of the nozzle array rack's lower guide rail and stabilizer assembly.

REFERENCE NUMERALS IN THE DRAWINGS

Figure 1:
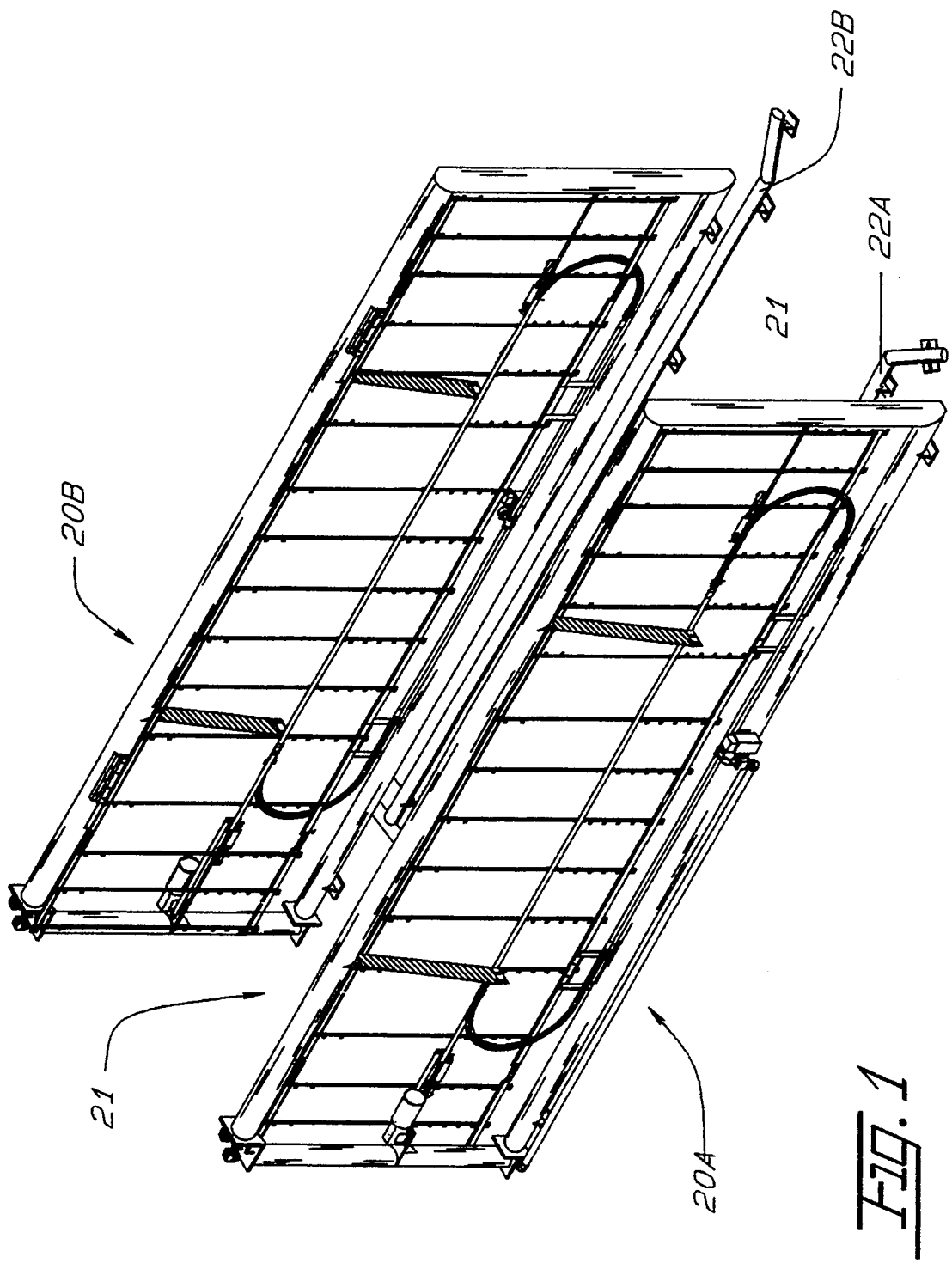
FIG. 1 is an isometric view of the preferred embodiment of the present invention.

The preferred embodiment consists of two sides that mirror image and are in apposition to each other. Reference numerals are suffixed A for the left side and B for the right side of the wash apparatus as viewed in FIG. 1.

| | | |
|---|---|---|
| 20A, | B | sides |
| 21 | | washer bay |
| 22A, | B | guide rails |
| 23 | | treadle switch |
| 24 | | high pressure fluid hose |
| 25 | | high pressure air hose |
| 26 | | drive-over cover plate |
| 27A, | B | frames |
| 28A, | B | top tubes |
| 29A, | B | bottom tubes |
| 30A, | B | entrance end tubes |
| 31A, | B | wet pressure vessel |
| 32A, | B | mounting pads |
| 33A, | B | pipes |
| 34A, | B | dry pressure vessels |
| 35A, | B | nozzle array racks |
| 36A, | B | nozzle feed tubes |
| 37A, | B | main manifolds |
| 38A, | B | nozzles |
| 39A, | B | main air valves |
| 40A, | B | main release valves |
| 41A, | B | feed pipe |
| 42A, | B | flexible pressure hose |
| 43A, | B | belting |
| 44A, | B | gearmotors |
| 45A, | B | connecting rods |
| 46A, | B | guide assemblies (top) |
| 47A, | B | guide assemblies (bottom) |
| 48A, | | bearing holder (top) |
| 49A, | | bearing holder (bottom) |
| 50A, | | slide bearing (top) |
| 51A, | | slide bearing (bottom) |
| 52A, | B | guides (top) |
| 53A, | B | guides (bottom) |
| 54A, | B | articulated rack front |
| 55A, | B | articulated rack rear |
| 56A, | B | air cylinder front |
| 57A, | B | air cylinder rear |
| 58A, | B | electric eyes front |
| 59A, | B | electric eyes rear |
| 60A, | B | check valves |
| 61A, | B | solenoid air valves |

DETAILED DESCRIPTION OF THE PREFERRED EMBODIMENT

Referring to FIGS. 1–9, a preferred embodiment of the present invention is shown as a high pressure vehicle wash system. FIG. 1 is an isometric view of the apparatus described herein and illustrates that my rapid vehicle washer consists of a left side 20A and a right side 20B, which sides are mirror images in apposition to each other. Sides 20A and 20B of the preferred embodiment define a washer bay 21 which contains a left guide rail 22A and a right guide rail 22B.

Figure 2:
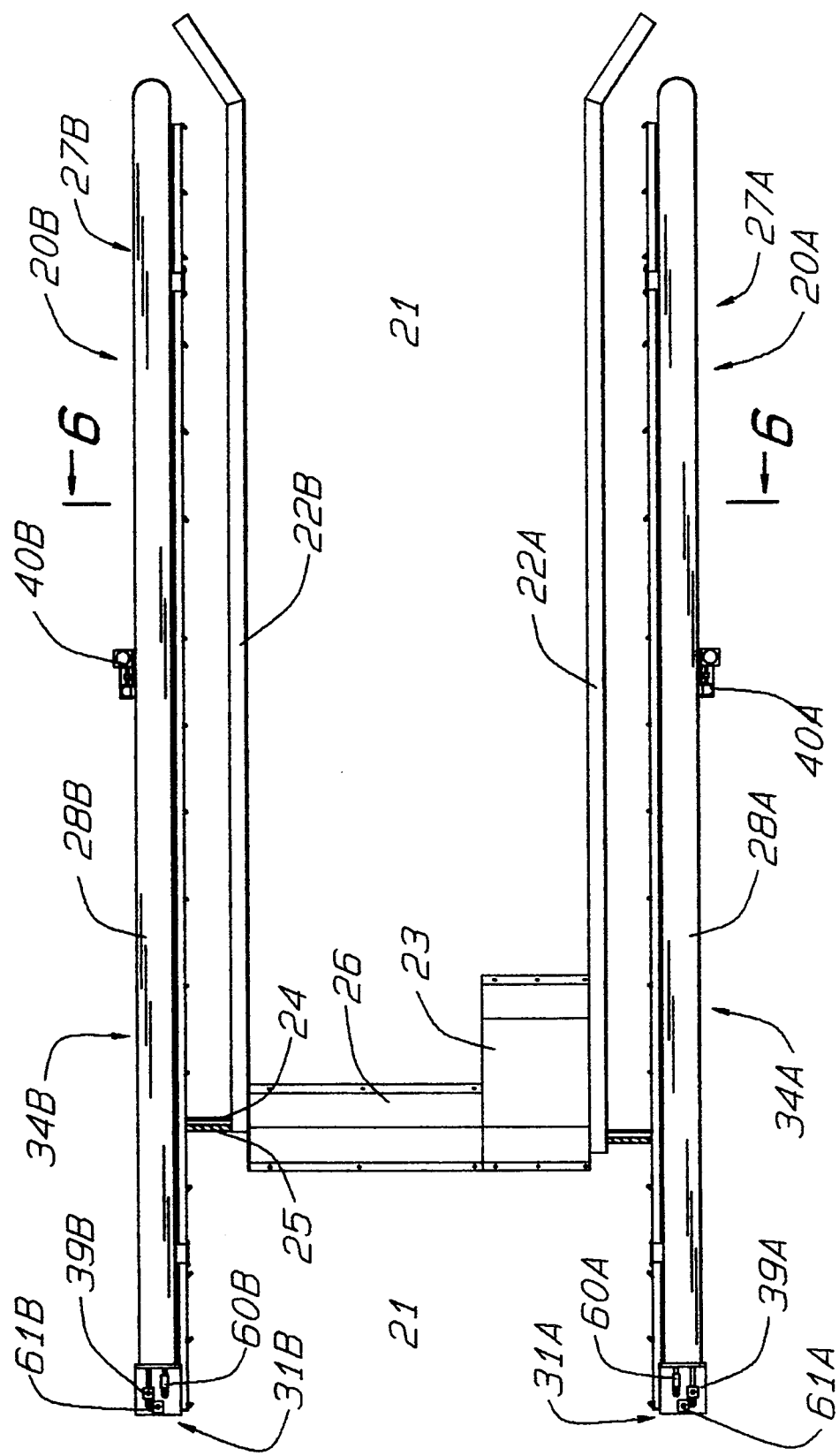
FIG. 2 is an orthographic view of the preferred embodiment from above the apparatus shown in FIG. 1.

FIG. 2 is a view of the washer bay 21 from above the apparatus described herein and shows the top of sides 20A and 20B. Guide rails 22A and 22B are so positioned that the wheels of the vehicle to be washed enter upon a bay treadle switch 23 properly aligned. Sides 20A and 20B are connected by a high pressure fluid hose 24 and a high pressure air hose 25, both protected by a steel drive-over cover plate 26.

Figure 3:
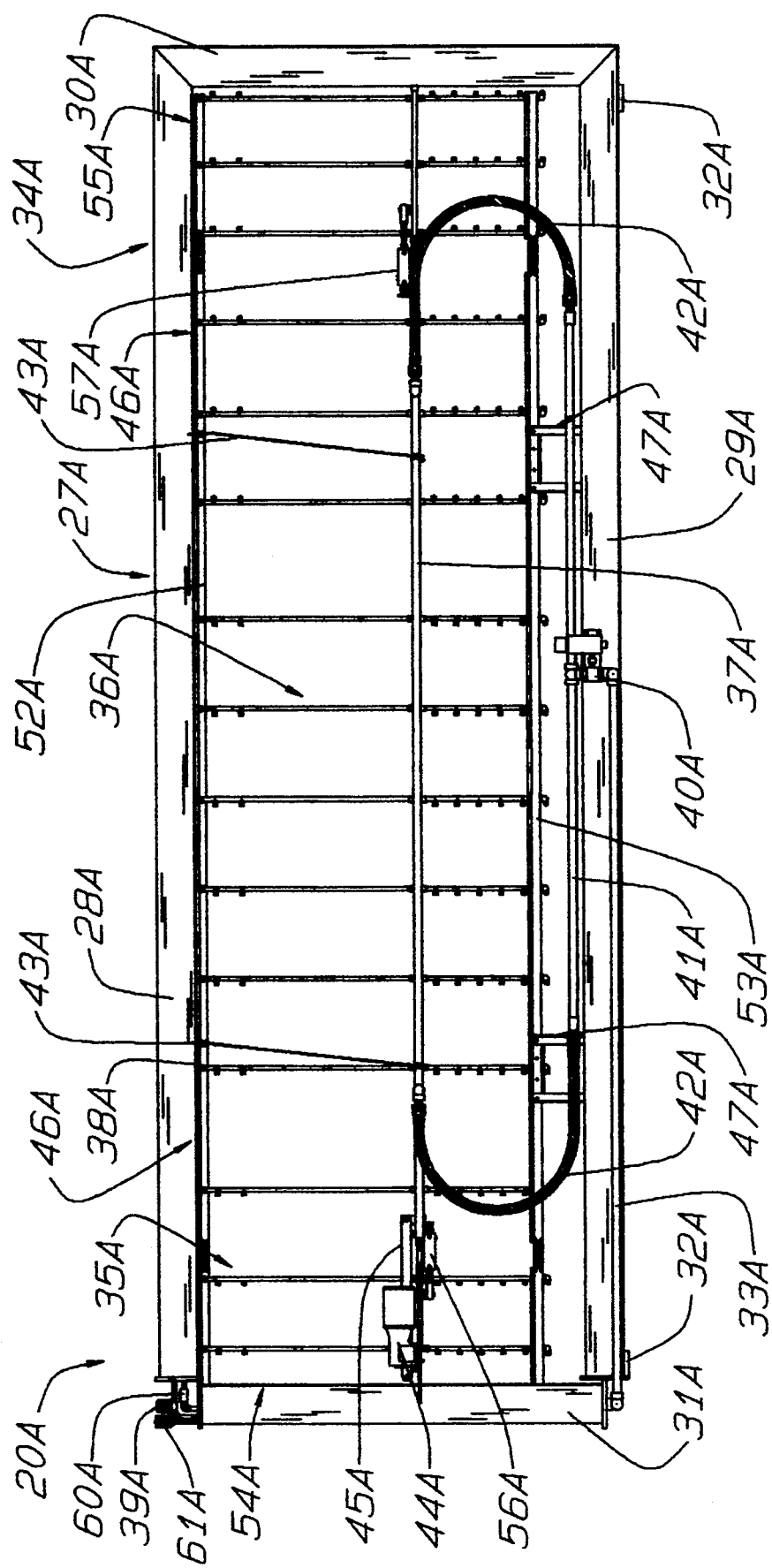
FIG. 3 is a side view of the near side of the preferred embodiment of the invention as shown in FIG. 1.

As further illustrated in FIG. 3, an orthographic view of side 20A, the preferred embodiment consists of a frame 27A, which consists of a top tube 28A, a bottom tube 29A, an entrance end tube 30A and a separate exit end tube forming a wet pressure vessel 31A. Side 20B, as illustrated in FIG. 4, consists a similar frame 27B composed of a top 28B, a bottom 29B, and an end 30B tubes, and a pressure vessel 31B. Mounting pads 32A and 32B are attached to the bottom tubes 29A and 29B respectively and serve to secure the sides 20A and 20B to the concrete floor embodying the washer bay 21. The tubes 28A, 29A, and 30A of frame 27A of the preferred embodiment are interconnected and unitized to form a single pressure vessel 34A, hereinafter termed the dry pressure vessel. The wet pressure vessel 31A connects to pressure vessel 34A through an air valve 39A and a check valve 60A. Likewise, frame 27B consists of tubes 28B, 29B, and 30B which are interconnected and unitized to form a single dry pressure vessel 34B that is connected by valves 39B and 60B to the liquid pressure vessel 31B.

The sides 20A and 20B of the preferred embodiment further consist of spray nozzle array racks designated 35A and 35B respectively. The racks 35A and 35B contain a multitude of nozzle feed tubes 36A and 36B respectively, mounted to which is a multitude of nozzles 38A and 38B arrayed in such a manner and at such angels as to completely cover the top, front, sides, and rear of the vehicle being washed, The tubes 36A and 36B are interconnected to the main manifolds 37A and 37B. The wet pressure vessels 31A and 31B are further connected by pipes 33A and 33B to valves 40A and 40B, thence through feed pipes 41A and 41B and flexible hoses 42A and 42B to the manifolds 37A and 37B respectively.

As shown in FIGS. 3 and 6, rack 35A is attached to side 20A by two pieces of flat belting 43A, or other suitable means, Likewise, as shown in FIGS. 4 and 6, rack 35B is attached to side 20B by means of flat belting 43B, Referring to FIG. 6, a sectional view of the preferred embodiment taken at section A—A of FIG. 2, detail of such an attachment is illustrated.

Referring again to FIGS. 3 and 4, the racks 35A and 35B are further attached to frames 27A and 27B respectively by means of gearmotors 44A and 44B with crank arms mounted thereto and their associated connecting rods 45A and 45B, which assemblies serve to impart a pendulous motion to the racks 35A and 35B. FIG. 7 illustrates this attachment. Lateral movement of racks 35A and 35B is controlled by two or more guide assemblies 46A at the top and 47A at the bottom of rack 35A and guide assemblies 46B and 47B respectively for rack 35B. Referring to FIGS. 8 and 9, the guide assemblies 46A and 47A consist of a supporting frames 48A and 49A respectively and self lubricating slide bearings 50A and 51A. Guide rails 52A and 52B are attached to rack 35A and slide in contact with the slide bearings 50A and 51A. Likewise, the guide assemblies 46B and 47B are composed of similar or identical frames and bearings; the guide rails 52B and 53B are attached to rack 35B.

The nozzle array racks 35A and 35B have articulated sections at the exit end, 54A and 54B respectfully, likewise, they have articulated sections 55A and 55B at the entrance end. Air cylinders 56A and 57A on the rack 35A and cylinders 56B and 57B on the rack 35B cause the articulation of these sections. Refering to FIGS. 4 and 5, the electric eyes 58A, 59A, 58B, and 59B, mounted on frames 27A and 27B respectively, serve to responsively signal a conventional electronic controller (not shown) to control this articulating action.

Referring again to FIGS. 2, 3, and 4, 60A and 60B are fluid check valves between the respective wet pressure chambers 31A and 31B and the dry pressure chambers 34A and 34B. Solenoid air valves 61A and 61B connect to an external compressed air supply (not shown), the use of valves 60A, 60B, 61A and 61B will become apparent as this description proceeds with the operational aspects of my vehicle washer process and apparatus.

OPERATION OF THE WASHER PROCESS AND APPARATUS

The wash process is controlled by any of a variety of electronic programmable controllers (not shown) as are well known in this art. The driver of the vehicle to be washed starts the process by activating this controller, usually through a money or code receiving device, as is weld known in this art, prior to driving into the wash bay 21.

Once started, the controller activates a high pressure pump or pumps (not shown) and water is forced into pressure vessels 31A and 31B displacing the air therein through the check valves 60A and 60B into the dry pressure vessels 34A and 34B.

At the same time, the vehicle is driven into the bay and its front wheel is placed upon the treadle switch 23. Optionally, a lower body rocker panel wash and/or undercarriage wash, as are well known in this art, may be applied to the vehicle as it enters the bay. About 15 seconds may be consumed by this part of the operation.

If the electric eyes 58A and 58B do not detect the front of a vehicle protruding into their beam, the controller will extend the air cylinders 56A and 56B, thus pivoting the articulated racks 54A and 54B into the bay f a vehicle is detected by the electric eyes, the racks 54A and 54B would not be pivoted. Likewise, if the electric eyes 59A and 59B at the rear the washer detect a long vehicle in the bay, the racks 55A and 55B will not pivot into the bay. This safety feature protects the vehicle being washed from damage by the aforementioned racks contacting it.

The switch 23 responsively signals the controller to start the process. A cleansing agent, as is well known in this art, is applied to the front, sides, rear, and top surfaces of the vehicle for about 5 seconds. Nozzles (not shown for clarity of showing) mounted on nozzle racks 35A and 35B apply this cleanser. Simultaneously, the gearmotors 44A and 44B may transmit a pendulous motion through their respective connecting rods 45A and 45B to the nozzle racks 35A and 35B.

A dwell time of approximately 10 seconds is allowed for the cleanser to react with the dirt on the vehicles surface. Next, an optional second cleansing agent may be applied for approximately 5 seconds. The use of dual application cleansing agents is well known within this art.

Again, a dwell time of approximately 15 seconds is allowed. If the optional second cleansing agent is not utilized, a dwell time of about 30 seconds will be allowed.

Now high pressure water is released from pressure vessels 31A and 31B for about 5 seconds to scour the front, sides, top, and rear of the subject vehicle. The valves 39A and 39B open releasing compressed air from the dry pressure vessels 34A and 34B into the wet pressure vessels 31A and 31B. Simultaneously, the valves 40A and 40B open releasing water through the feed pipes 41A and 41B, the flexible hoses 42A and 42B, the manifolds 37A and 37B, the nozzle feed tubes 36A and 36B, and finally through the nozzle arrays 38A and 38B. The gearmotors 44A and 44B may have continued to operate during the above procedures, imparting a pendulous motion to the nozzle racks 35A and 35B, thus assuring full coverage and impingement upon the surfaces of the subject vehicle.

Following this high pressure scouring process, an optional fresh water rinse may be applied for approximately 5 seconds, thus bringing the total time of the wash to approximately 60 seconds. This rinse may alternately be a wax application or a drying agent application if a blower/dryer is used in conjunction with this process, as is well known in this art.

The preceding description defines a typical wash process for conventional automobiles, vans, and light trucks, it being understood that numerous variants may be necessary or desirable with changing vehicle sizes, available water supply, electrical service size, or other factors.

A unique feature of my rapid vehicle washer apparatus is the use of the high pressure water pump(s) to build up air pressure in the dry pressure chambers 34A and 34B. Starting with all pressure vessels empty and at atmospheric pressure, compressed air is introduced into the vessels through the solenoid air valves 61A and 61B to a pressure of about 150 pounds per square inch, these air valves then close. Next the high pressure pump(s) start and fill the vessels 31A and 31B, interconnected by the hose 25, with water, forcing the air therein through the one way check valves 60A and 60B into the dry pressure vessels 34A and 34B which are interconnected by means of the air hose 25. When the vessels 31A and 31B are filled, the pump(s) stop, the valves 40A and 408 open, and the valves 61A and 61B open allowing compressed air to force the water out through the valves 40A and 40B, thus emptying the vessels 31A and 31B. The valves 40A and 40B now close allowing air pressure to again build up in the vessels 31A and 31B and then the air valves 61A and 61B close. The cycle of pumping water into the vessels 31A and 31B and then discharging it is repeated many times, The check valves 60A and 60B will not allow the air forced into the vessels 34A and 34B to return to the vessels 31A and 31B when they are emptied of liquid as described in the preceding cycle. Thus, each cycle repeated will increase the air pressure in the vessels 34A and 34B until sufficient pressure is built up (about 1000 pounds per square inch) to allow the wash process to operate properly. This procedure will be necessary only if some or all air pressure is lost for some reason such as blowing condensate out of the dry pressure vessels; it is not required for each vehicle washed.

It will be appreciated that the invention may further be embodied in still other specific forms without departing from the spirit or essential characteristics thereof, Other embodiments might place pressure vessels at a location remote from the wash bay, such as an equipment room, rather than incorporating them into the wash apparatus as shown in the illustrated embodiment. Further embodiments might utilize different nozzle arrangements to impinge the scouring liquid upon the vehicle being washed. Yet another embodiment might utilize a very high pressure air compressor to force the water out of the pressure vessels to impinge upon the vehicle being washed. The present embodiments are, therefore, to be considered as illustrative with the scope of the invention being indicated by the appended claims and such valid construction thereof as embraces the equivalents to which they are entitled.

I claim:

1. An apparatus for washing vehicles by the forceful impingement of a liquid thereon, and comprising:
   two frames, one on each side of said vehicle, each frame comprising plural tubes constituting pressure vessels with the capacity to contain said liquid at a volume predetermined to be substantially sufficient to impinge upon substantially all selected surfaces of said vehicle;

a means to supply said liquid to selected ones of said tubes;

a means to supply pressurized air or gas to selected ones of said tubes to define at least one air or gas pocket;

means to communicate said air or gas pocket with said predetermined quantity of liquid to expel said liquid from said tubes at pressures predetermined to be adequate for scouring force upon said vehicle;

said liquid connected by conduit tube means and at least one discharge valve means to, a plurality of nozzles having a predetermined flow capacity adequate to expeditiously discharge said liquid from said pressure vessels, and connected to conduit means arrayed to form at least two nozzle racks, one mounted on each said frame, and directed so as to impinge said liquid upon substantially all selected surfaces of said vehicle.

2. An apparatus for washing vehicles by the forceful impingement of a liquid thereon, and comprising:

frame means comprising at least two sections, one on each side of said vehicle;

at least one pressure vessel means with the capacity to contain said liquid at a volume predetermined to be substantially sufficient to impinge upon selected surfaces of said vehicle;

said pressure vessel means comprising plural tubes constituting said frame means;

a means to supply said liquid to said pressure vessel means;

a means to supply pressurized air or gas to said pressure vessel means to define at least one air or gas pocket;

means to communicate said air or gas pocket with said predetermined quantity of liquid to rapidly expel said liquid from said pressure vessel means at pressures predetermined to be adequate for scouring force upon said vehicle;

conduit tube means and at least one discharge valve means, connecting said pressure vessel means to a plurality of nozzles having a predetermined flow capacity sufficient to rapidly discharge said liquid from said pressure vessel means;

said plurality of nozzles connecting to conduit tube means and arrayed to form at least two nozzle racks, one mounted on each said frame, and directed so as to impinge said liquid upon substantially all selected surfaces of said vehicle.

* * * * *